(12) United States Patent
Yochai et al.

(10) Patent No.: US 8,930,663 B2
(45) Date of Patent: Jan. 6, 2015

(54) HANDLING ENCLOSURE UNAVAILABILITY IN A STORAGE SYSTEM

(71) Applicant: Infinidat Ltd., Hertzelia (IL)

(72) Inventors: Yechiel Yochai, Moshav Aviel (IL); Sivan Tal, Kibbutz Sarid (IL); Leo Corry, Ramat Gan (IL)

(73) Assignee: Infinidat Ltd., Hertzelia (IL)

( * ) Notice: Subject to any disclaimer, the term of this patent is extended or adjusted under 35 U.S.C. 154(b) by 332 days.

(21) Appl. No.: 13/624,988

(22) Filed: Sep. 24, 2012

(65) Prior Publication Data

US 2014/0089580 A1    Mar. 27, 2014

(51) Int. Cl.
*G06F 12/00* (2006.01)
*G06F 13/00* (2006.01)
*G06F 13/28* (2006.01)
*G06F 3/06* (2006.01)
*G06F 11/10* (2006.01)

(52) U.S. Cl.
CPC ............ *G06F 3/1617* (2013.01); *G06F 3/0689* (2013.01); *G06F 3/065* (2013.01); *G06F 11/1092* (2013.01)

USPC ............................. 711/165; 711/114; 711/154

(58) Field of Classification Search
CPC . G06F 11/1076; G06F 11/1092; G06F 11/14; G06F 11/2094
USPC .......................................... 711/114, 154, 165
See application file for complete search history.

(56) References Cited

U.S. PATENT DOCUMENTS

| 2007/0106870 | A1* | 5/2007 | Bonwick et al. | ............... 711/170 |
| 2012/0047339 | A1* | 2/2012 | Decasper et al. | ............. 711/162 |
| 2013/0173955 | A1* | 7/2013 | Hallak et al. | ................. 714/6.24 |

\* cited by examiner

*Primary Examiner* — Ryan Bertram
(74) *Attorney, Agent, or Firm* — Oren Reches

(57) ABSTRACT

The presently disclosed subject matter includes, inter alia, a storage system and a method of managing allocation of data in case an enclosure in a storage system becomes unavailable. The storage system has a storage space configured as a plurality of RAID groups, each RAID group comprising N parity members. According to one aspect of the disclosed subject matter, responsive to a write request, at least one section allocated to a disk in an unavailable enclosure is identified; at least one temporary RAID group in a spare storage space of the storage system is allocated and data related to the write request is written to the alternative RAID group.

19 Claims, 6 Drawing Sheets

HANDLING ENCLOSURE UNAVAILABILITY IN A STORAGE SYSTEM

FIELD OF THE INVENTION

The present invention relates, in general, to data storage systems with implemented RAID protection and methods of operating thereof.

BACKGROUND OF THE INVENTION

Modern enterprises are investing significant resources to preserve and provide access to data. Data protection is a growing concern for businesses of all sizes. Users are looking for a solution that will help to verify that critical data elements are protected, and for storage configurations that can ensure data integrity and provide a reliable and safe switch to redundant computing resources in case of an unexpected disaster or service disruption.

To accomplish this, storage systems may be designed as fault tolerant systems spreading data redundantly across a set of storage-nodes and enabling continuous operation when a hardware failure occurs. Fault tolerant data storage systems may store data across a plurality of disk drives and may include duplicate data, parity or other information that may be employed to reconstruct data if a drive fails. Data storage formats, such as RAID (Redundant Array of Independent Discs), may be employed to protect data from internal component failures by distributing data portions across a plurality of storage devices and rebuilding lost or damaged data.

SUMMARY

According to an aspect of the presently disclosed subject matter there is provided a method of managing allocation of data in case an enclosure becomes unavailable for use with a storage system, the storage system comprising a plurality of disk enclosures constituting a physical storage space, each disk enclosure comprising a plurality of physical disks, the physical storage space being configured as a plurality of RAID groups, each RAID group comprising N parity members; the method comprising, responsive to a write request:
 identifying in a stripe to be written to a given RAID group at least one section allocated to a disk in an unavailable enclosure; allocating at least one temporary RAID group in a spare storage space of the storage system; and writing data related to the write request in the alternative RAID group.

According to certain embodiments of the presently disclosed subject matter the method further comprising: in case the given enclosure becomes available, copying data from the temporary RAID group to the given RAID group.

According to certain embodiments of the presently disclosed subject matter the method further comprising: before a preplanned disconnection of the given enclosure:
 identifying a RAID GROUP having more than a predefined number of members stored in the given enclosure, wherein the predefined number corresponds to a number of the N parity members in the RAID groups; allocating an alternative RAID group for the identified RAID group; wherein the alternative RAID group does not have more than the predefined number of members in the given enclosure; copying data from the identified RAID group to the alternative RAID group; and disconnecting the given enclosure upon successful copying.

According to certain embodiments of the presently disclosed subject matter the predefined number is equal to the N.

According to certain embodiments of the presently disclosed subject matter the storage system implements RAID 6 and N equals 2.

According to another aspect of the presently disclosed subject matter there is provided a method of managing allocation of data in case an enclosure becomes unavailable for use with a storage system, the storage system comprising a plurality of disk enclosures constituting a physical storage space, each disk enclosure comprising a plurality of physical disks, the physical storage space being configured as a plurality of RAID groups, each RAID group comprising N parity members; the method comprising, responsive to a write request:
 identifying in data to be written to a given RAID group at least one section of a first type, destined to be written to a disk located in an unavailable enclosure and sections of a second type destined to be written to other respective disks in other enclosures; writing data in the at least one section of the first type to a spare storage space of the storage system; writing data in the sections of the second type to the other respective disks.

According to another aspect of the presently disclosed subject matter there is provided a method of managing allocation of data in case an enclosure becomes unavailable for use with a storage system, the storage system comprising a plurality of disk enclosures constituting a physical storage space, each disk enclosure comprising a plurality of physical disks, the physical storage space is configured as a plurality of RAID groups, each RAID group comprising N parity members; the method comprising:
 before a preplanned disconnection of the given enclosure:
 identifying a given RAID group having more than a predefined number of members stored in the given enclosure, wherein the predefined number corresponds to a number of the N parity members in the RAID groups; allocating an alternative RAID group for the given RAID group, in a spare storage space of the storage system; wherein the alternative RAID group does not have more than the predefined number of sections in the given enclosure; copying data from the given RAID group to the alternative RAID group, thereby obtaining free storage space which has been allocated to the given RAID group in disks located in enclosures other than the given enclosure; and disconnecting the given enclosure upon successful copying.

According to certain embodiments of the presently disclosed subject matter the method further comprising, responsive to a write request:
 identifying in a stripe to be written, at least one section directed to a disk in the given enclosure; allocating at least one new RAID group in the free space; and writing data related to the write request to the new RAID group.

According to another aspect of the presently disclosed subject matter there is provided a control layer operatively connectible to a storage system, the storage system comprising a plurality of disk enclosures constituting a physical storage space, each disk enclosure comprising a plurality of physical disks, the physical storage space is configured as a plurality of RAID groups, each RAID group comprising N parity members; the control layer is associated with at least one processor and is configured to manage allocation of data in case an enclosure becomes unavailable; responsive to a write request the control layer is operable to perform at least one of the following (a) or (b):
 (a) identify in a stripe to be written to a given RAID group at least one section directed to a disk in an unavailable enclosure; allocate at least one temporary RAID group in a spare storage space of the storage system; and write data related to the write request in the alternative RAID group;

(b) identify in a stripe to be written to a given RAID group at least one section of a first type, destined to be written to a disk located in an unavailable enclosure and sections of a second type destined to be written to other respective disks in other enclosures; write data in the at least one section of the first type to a spare storage space of the storage system; and write data in the sections of the second type to the other respective disks.

According to certain embodiments of the presently disclosed subject matter the control layer being further operable, in case the given enclosure becomes available, to copy data from the temporary RAID group to the given RAID group.

According to certain embodiments of the presently disclosed subject matter the control layer being further operable, before a preplanned disconnection of the given enclosure to: identify a RAID group having more than a predefined number of members stored in the given enclosure, wherein the predefined number corresponds to a number of the N parity members in the RAID groups; allocate an alternative RAID group for the identified RAID group; wherein the alternative RAID group does not have more than the predefined number of members in the given enclosure; copy data from the identified RAID group to the alternative RAID group; and disconnect the given enclosure upon successful copying.

According to another aspect of the presently disclosed subject matter there is provided a control layer operatively connectible to a storage system, the storage system comprising a plurality of disk enclosures constituting a physical storage space, each disk enclosure comprising a plurality of physical disks, the physical storage space is configured as a plurality of RAID groups, each RAID group comprising N parity members; the control layer is associated with at least one processor and is configured to manage allocation of data in case an enclosure becomes unavailable;

the control layer being operable before a preplanned disconnection of the given enclosure: to identify a given RAID group having more than a predefined number of members stored in the given enclosure, wherein the predefined number corresponds to a number of the N parity members in the RAID groups; allocate an alternative RAID group for the given RAID group, in a spare storage space of the storage system; wherein the alternative RAID group does not have more than the predefined number of sections in the given enclosure; copy data from the given RAID group to the alternative RAID group, thereby obtaining free storage space which has been allocated to the given RAID group in disks located in enclosures other than the given enclosure; and disconnect the given enclosure upon successful copying.

According to a certain embodiment of the presently disclosed subject matter, the control layer being further configured, responsive to a write request to: identify in a stripe to be written, at least one section directed to a disk in the given enclosure; allocate at least one new RAID group in the free space; and write data related to the write request to the new RAID group.

According to a certain embodiment of the presently disclosed subject matter the control layer being further configured, in case the given enclosure becomes available, to allocate a new spare storage space in the given enclosure.

According to another aspect of the presently disclosed subject matter there is provided a program storage device readable by machine, tangibly embodying a program of instructions executable by the machine to perform a method of managing allocation of data in case an enclosure in a storage system becomes unavailable, the storage system comprising a plurality of disk enclosures constituting a physical storage space, each disk enclosure comprising a plurality of physical disks, the physical storage space is configured as a plurality of RAID groups, each RAID group comprising N parity members;

the method comprising performing at least one of (a) or (b), responsive to a write request:

(a) identifying in a stripe to be written to a given RAID group at least one section directed to a disk in an unavailable enclosure; allocating at least one temporary RAID group in a spare storage space of the storage system; and writing data related to the write request in the alternative RAID group;

(b) identifying in a stripe to be written to a given RAID group at least one section of a first type, destined to be written to a disk located in an unavailable enclosure and sections of a second type destined to be written to other respective disks in other enclosures; writing data in the at least one section of the first type to a spare storage space of the storage system; and writing data in the sections of the second type the other RAID groups.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which.

DETAILED DESCRIPTION

Unless specifically stated otherwise, as apparent from the following discussions, it is appreciated that throughout the specification discussions utilizing terms such as "identifying", "allocating", "writing", "copying", "inhibiting", "delaying" or the like, include action(s) and/or processes of a computer that manipulate and/or transform data into other data, said data represented as physical quantities, e.g. such as electronic quantities, and/or said data representing the physical objects.

Figure 1:
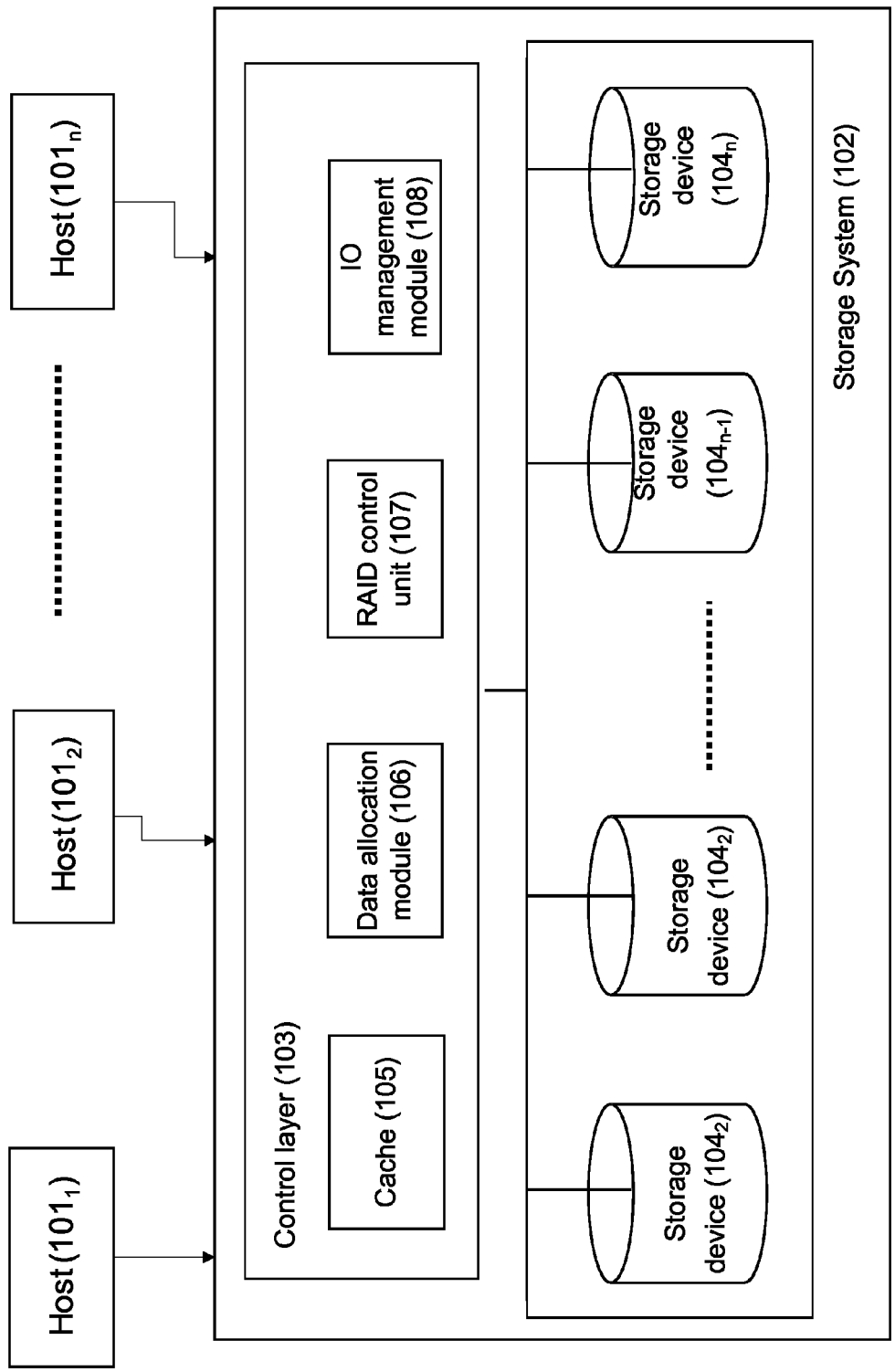
FIG. 1 is a functional block diagram schematically illustrating a data-storage system-architecture, according to the presently disclosed subject matter.

FIG. 1 illustrates a general schematic of the system architecture in accordance with the presently disclosed subject matter. Certain embodiments of the present invention are applicable to the architecture of a computer system described with reference to FIG. 1. However, the invention is not bound by the specific architecture; equivalent and/or modified functionality may be consolidated or divided in another manner and may be implemented in any appropriate combination of software, firmware and hardware. Those versed in the art will readily appreciate that the invention is, likewise, applicable to any computer system and any storage architecture implementing a virtualized storage system. In different embodiments of the invention the functional blocks and/or parts thereof may be placed in a single or in multiple geographical locations (including duplication for high-availability and/or implementation of cloud computing architecture). Control layer 103 described below with reference to FIG. 1, comprises or is otherwise associated with at least one processor operable, responsive to instructions, to execute operations as described herein. The term "processor" should be expansively construed to cover any kind of electronic device with data processing capabilities, including, by way of non-limiting example, a personal computer, a server, a computing system, a communication device, a processor (e.g. digital signal processor (DSP), a microcontroller, a field programmable gate array (FPGA), an application specific integrated circuit (ASIC), etc.), any other electronic computing device, and or any combination thereof.

Operative connections between the blocks and/or within the blocks may be implemented directly (e.g. via a bus) or indirectly, including remote connection. Connections between different components illustrated in FIG. 1, may be provided via Wire-line, Wireless, cable, Internet, Intranet, power, satellite or other networks and/or using any appropriate communication standard, system and/or protocol and variants or evolutions thereof (as, by way of unlimited example, Ethernet, iSCSI, Fiber Channel, etc.).

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

Figure 3:
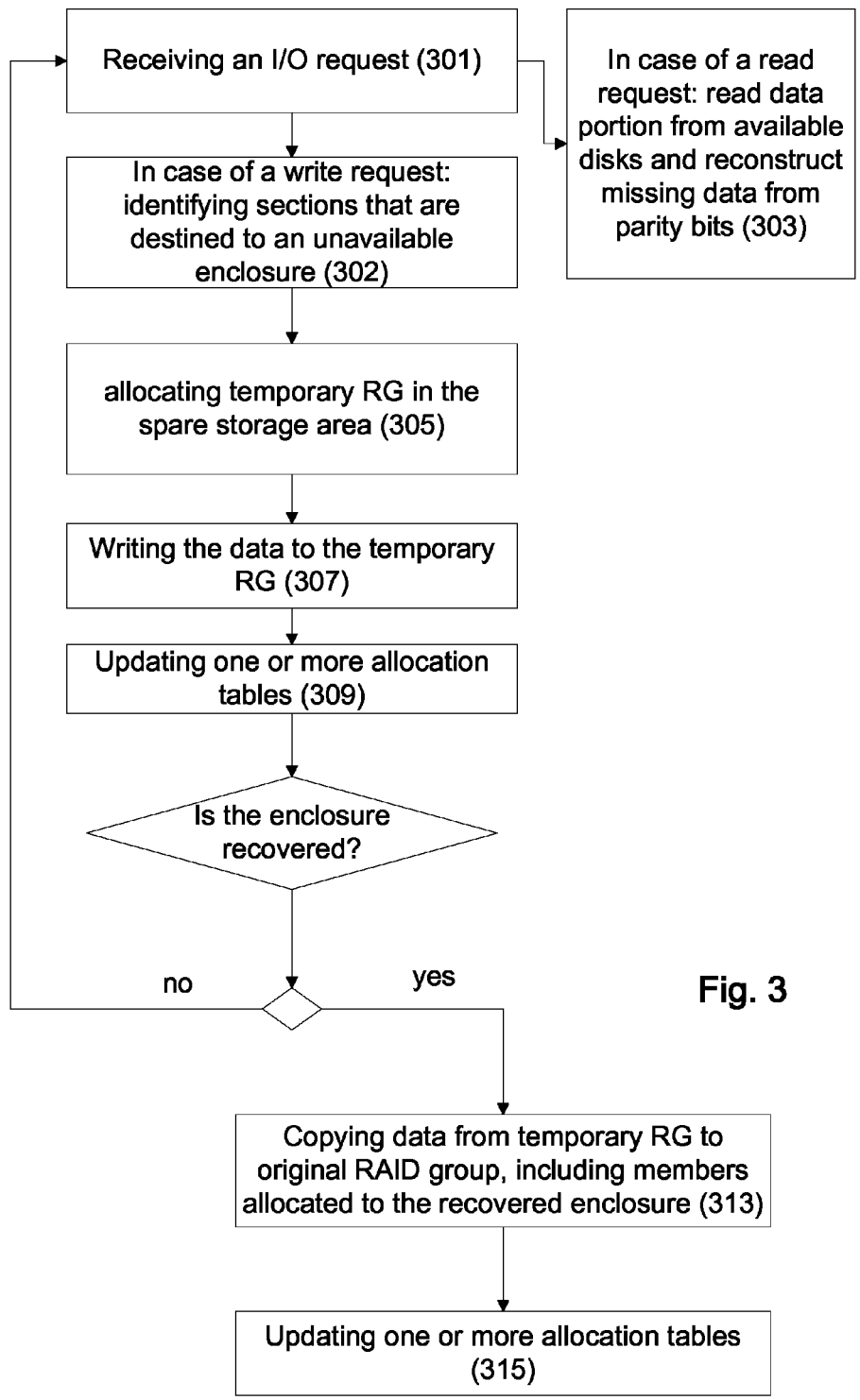
FIG. 3 is a flowchart illustrating a sequence of operations carried out, in accordance with the presently disclosed subject matter.
Figure 4:
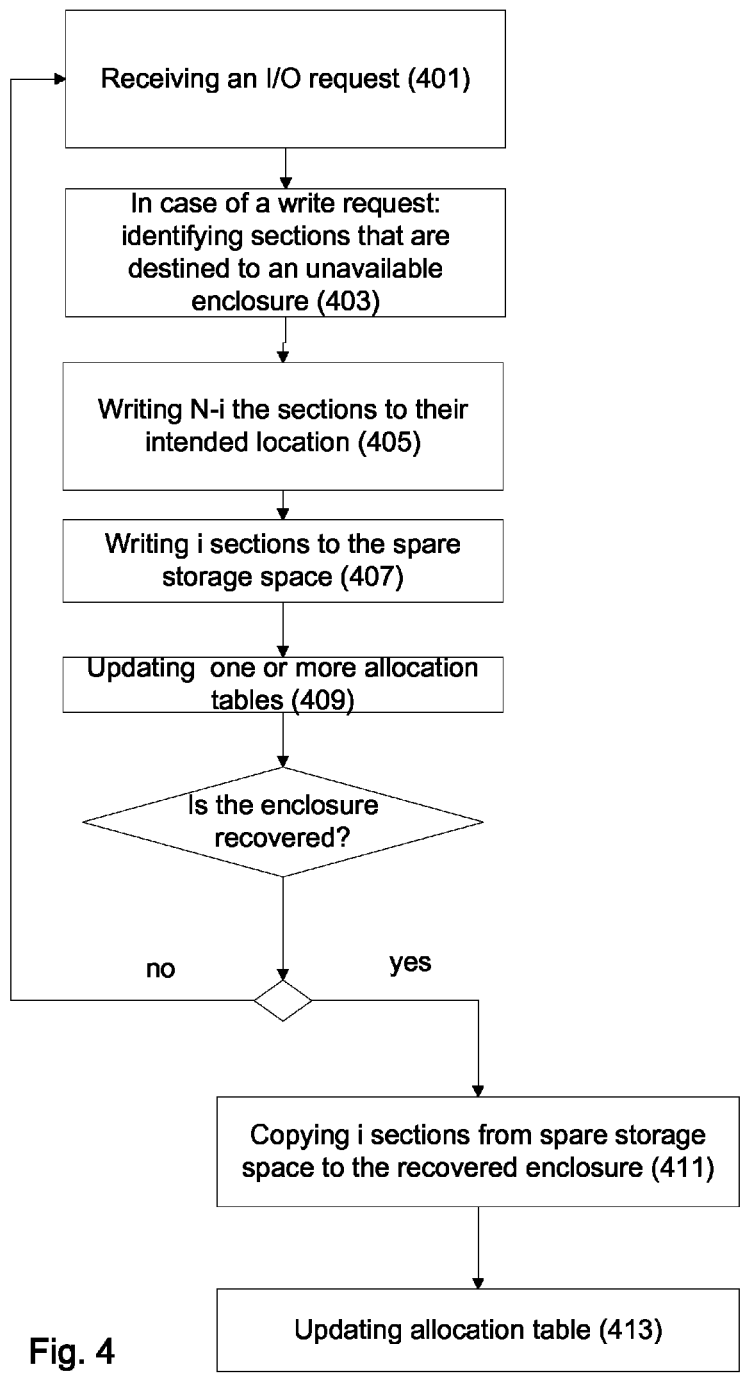
FIG. 4 is another flowchart illustrating a sequence of operations carried out, in accordance with the presently disclosed subject matter.
Figure 5:
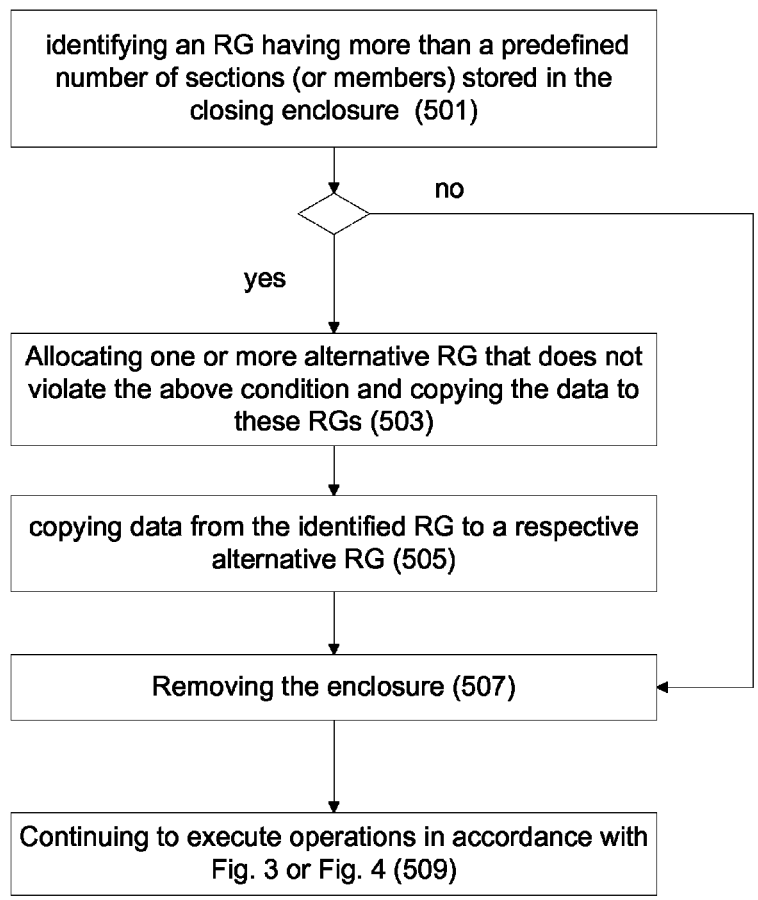
FIG. 5 is a flowchart illustrating a sequence of operations carried out in preparation to enclosure-unavailability, in accordance with the presently disclosed subject matter.

In embodiments of the presently disclosed subject matter, fewer, more and/or different stages than those shown in FIGS. 3, 4 and 5 may be executed. In embodiments of the presently disclosed subject matter one or more stages illustrated in FIGS. 3, 4 and 5 may be executed in a different order and/or one or more groups of stages may be executed simultaneously. FIG. 1 illustrates a general schematic of the system architecture in accordance with an embodiment of the presently disclosed subject matter. Each module in FIG. 1 can be made up of any combination of software, hardware and/or firmware that performs the functions as defined and explained herein. The modules in FIG. 1 may be centralized in one location or dispersed over more than one location. In other embodiments of the presently disclosed subject matter, the system may comprise fewer, more, and/or different modules than those shown in FIG. 1.

Bearing this in mind, attention is drawn to FIG. 1 showing a functional block diagram schematically illustrating a data-storage system-architecture, according to the presently disclosed subject matter. FIG. 1 shows one or more host computers $101_{1-n}$ illustrated as sharing common storage utility provided by a virtualized storage system 102. A host ($101_{1-n}$) can be for example a workstation, an external server, a group of servers, a port in a server, a laptop or personal computer etc.

The storage system comprises a storage control layer 103 comprising one or more appropriate storage control devices operatively coupled to the plurality of host computers $101_{1-n}$ and to a plurality of data storage devices $104_{1-n}$ constituting a physical storage space optionally distributed over one or more storage nodes. Storage control layer 103 is operable to control input and output (I/O) operations between hosts $101_{1-n}$ and data storage devices $104_{1-n}$ Storage control layer 103 and the storage devices may communicate with the host computers and within the storage system in accordance with any appropriate storage protocol. Connection between host computers $101_{1-n}$ and storage system 102 and/or the connection between control layer 103 and storage devices $104_{1-n}$ can be a direct connection and/or it may established over a communication network, (e.g. where storage system is distributed in a cloud-computing architecture).

The physical storage space may comprise any appropriate non-transitory storage medium including, by way of non-limiting example, one or more Solid State Disk (SSD) drives, Hard Disk Drives (HDD) and/or one or more disk units (DUs) also known as "disk enclosures" or "disk drawers", each comprising several disk drives. For example, according to one possible configuration the physical storage space includes 512 disks divided to 8 enclosures (i.e. each enclosure comprising around 60 disks).

The storage control layer 103 is further operable to handle a virtual representation of physical storage space and to facilitate necessary mapping between the physical storage space and its virtual representation. Control layer 103 is configured to create and manage at least one virtualization layer interfacing between elements of the computer system external to the storage system (e.g. host computers $101_{1-n}$, etc.) and the physical storage space. Optionally, the functions of control layer 103 may be fully or partly integrated with one or more host computers and/or storage devices and/or with one or more communication devices enabling communication between the hosts and the storage devices. Elements within control layer 103 can be implemented as centralized modules operatively connected to the plurality of storage control devices or can be distributed over a part or all storage control devices.

Stored data may be logically represented to a client (host) in terms of logical objects. Depending on the storage protocol, the logical objects may be logical volumes, data files, multimedia files, snapshots and other copies, etc. Typically, definition of logical objects in the storage system involves in-advance configuring an allocation scheme and/or allocation function used to determine the location of the various data portions (and their associated parity portions) across the physical storage medium. The allocation scheme can be handled for example, by allocation module 106 being a part of control layer 103. The location of various data portions allocated across the physical storage can be recorded and monitored with the help of one or more allocation tables linking between logical data addresses and their corresponding allocated location in the physical storage. Logical contiguity of successive portions and physical contiguity of the storage location allocated to the portions in the system are not necessarily correlated.

The storage control layer can further comprise a cache memory 105 operable as part of the I/O flow in the system, a cache manager (not shown), operable to control data activity in the cache and an I/O management module 108 for receiving and handling commands (including I/O commands) and enabling execution of the respective operations.

A request, initiated, for instance, by a host, is received by I/O management module 108 (which can be configured for example, as part of the port layer), which is operable to identify and process the request. A read request for example is transmitted to the cache manager which is operable to determine whether the requested data is present in cache 105 and process the request accordingly.

The storage control layer may be further configured to facilitate various protection schemes, with the help of RAID control unit 107. For example, data storage formats, such as RAID (Redundant Array of Independent Discs), may be employed in order to improve performance and protect data from internal component failures by making copies of data and rebuilding lost or damaged data. A RAID control unit 107 is operatively connected to multiple physical storage devices and presents them as a consolidated logical storage device.

Figure 2:
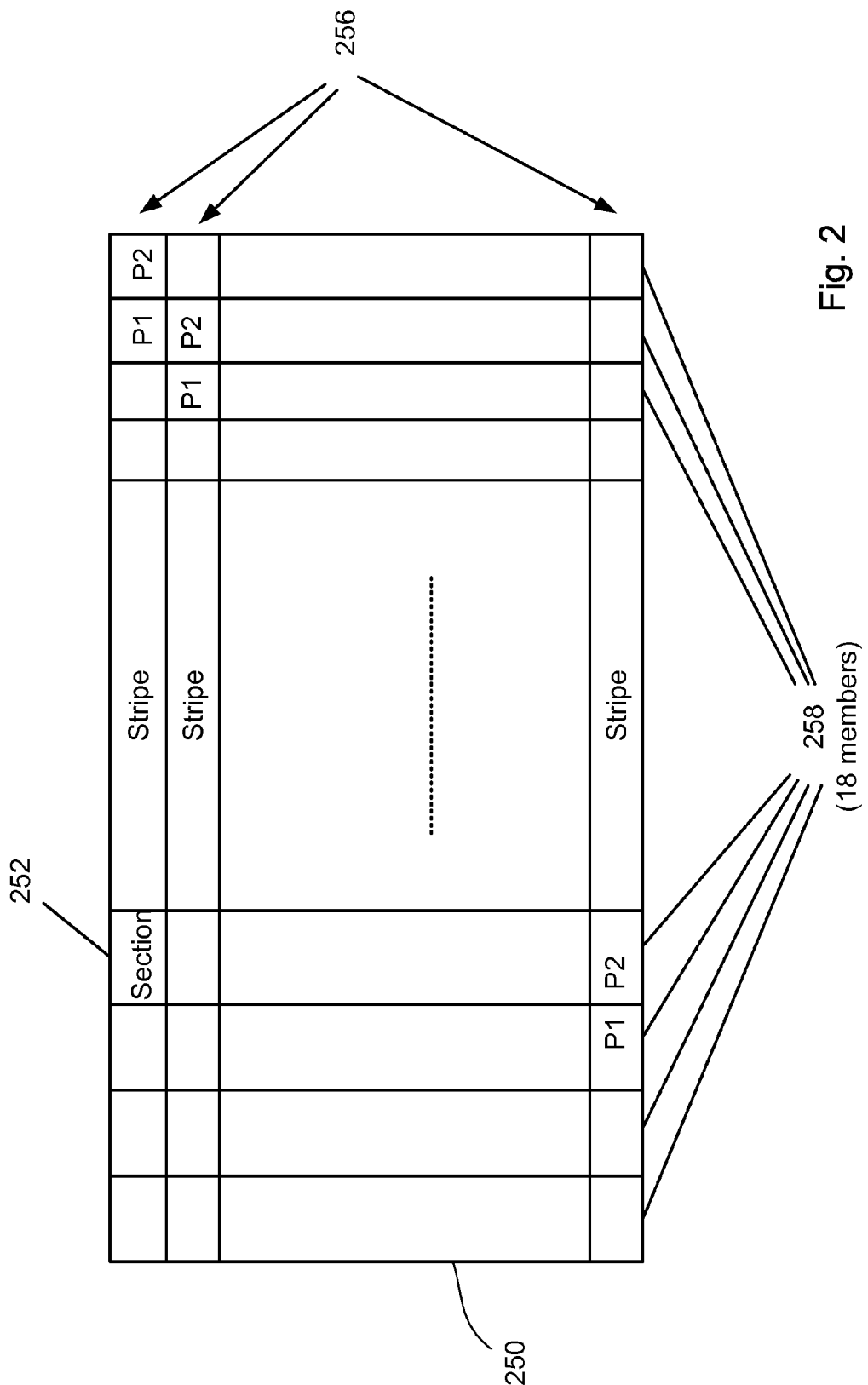
FIG. 2 is a schematic illustration of a diagram of RAID group storage architecture as known in the art.

FIG. 2 is a schematic illustration of a diagram of RAID group storage architecture as known in the art. A RAID group (250) can be built as a concatenation of stripes (256), the stripe being a complete (connected) set of data portion, including parity portions (comprising parity bits), that are dependently related by parity computation relations. In other words, the stripe is the unit within which the RAID write and recovery algorithms are performed in the system.

Considering for example, well known RAID 6 data protection scheme, common to all RAID 6 protection schemes, is the use of two parity data portions per several data groups, where N being the number of data portions per RAID group (e.g. N=16). As seen in FIG. 2, a stripe comprises N+2 data portions (N data+2 parity). The data portions (or sections) being the intersection of a stripe with a member of the RAID group. A member (258) is a column of data portions of all stripes in a RAID group.

Whenever data is written to a data portion in a group, the parity portions are also calculated (e.g. using techniques based on XOR and Reed-Solomon algorithms). Whenever a data portion in a group becomes unavailable (e.g. because of disk drive general malfunction, or because of a local problem affecting the portion alone, or because of other reasons), the data can still be retrieved, with the help of one parity portion via appropriate known in the art techniques. In case RAID 6 is implemented, if a second malfunction causes data unavailability in the same drive before the first problem was repaired, data can nevertheless be recovered using the second parity portion and appropriate known in the art techniques. One possible configuration of data-storage system 102 includes 256K stripes per RAID group with a total of around 7000 RAID groups in the system.

The storage system is configured to allocate (e.g. with the help of RAID control unit 107) members of RAID groups over various physical disks. In order to reduce the probability of data loss, different members of the same RAID group as well as their parity portions are typically stored in separate enclosures. Furthermore, the mapping of members to disk partitions is so as not to have more members of the same RAID group mapped to disks from the same enclosure, than the number of parity bits of the RAID scheme. This mapping scheme ensures that in case an enclosure fails, the RAID group is still usable and data can be retrieved using the parity bits of the stripe. In general, mapping of the RAID groups to disk partitions is static, as long as there are no failures of disks.

In addition, some part of the disks is kept for system use (known as "spare" storage space). The size of the spare storage can vary and can be equal to a certain percentage of the total storage volume of the disks in each enclosure. For example, the spare storage can comprise 5% of the total volume of the disks in the enclosure, which is the equivalent of 3 disks in a 60 disks enclosure. The spare storage space (which is usually distributed on a number of different disks and different enclosures) can be used for background operations as defragmentation and for the RAID group rebuild process.

In the event of disk failure, RAID control unit 107 is further operable to execute a rebuild process. A rebuild process can be executed when one or more disks become unavailable (e.g. as a result of disk failure) and it is assumed that the disk will not be recovered in the near future. In such cases, it is required to recover the data stored on the failing disk and place it in a different disk in the storage system. In a rebuild process, all the stripes, some of whose sections are located on a failed disk, are assigned with new stripes in other disks and their data is restored (with the help of the parity bits) and copied to the newly assigned stripes. The rebuild process is a lengthy process that competes on the system resources with the standard I/O activity.

In some cases an entire disk enclosure can become unavailable. This situation may occur for example, as a consequence of an unexpected failure of a disk enclosure. In addition, a disk enclosure may become inoperable as a consequence of a preplanned maintenance operation.

Common to these two scenarios is that the state of the system in which one enclosure is unavailable is a temporary state. It is assumed that the disks in the unavailable enclosure are not damaged and once the enclosure is fixed or replaced, the system (and the disks) will continue to operate as before.

According to the presently disclosed subject matter, in cases where a read request which is received at control layer 103 is directed to a disk in an unavailable enclosure or in case data is destined to be written to a disk in an unavailable enclosure, control layer 103 is configured to execute special operations in order to handle these requests. The teaching disclosed herein includes a technique for handling unavailability of an enclosure including RAID group management and handling of reading data from and writing data to an unavailable enclosure, while ensuring minimum degradation of the system's performance and preservation of data integrity.

FIG. 3 is a flowchart illustrating a sequence of operations carried out, in accordance with the presently disclosed subject matter. At block 301 a write request or a read request is received. As mentioned above, read and write requests are initially handled by I/O management module 108. In order to enable reconstruction of the data in case of enclosure unavailability, the number of members of the same RAID group, which are stored on disks of the same enclosure, should not exceed the parity number. Thus, for example in case of a RAID 6 scheme, only up to 2 members of the same RAID group are stored in the same enclosure. Otherwise, in case of enclosure unavailability, the relevant data cannot be recovered with the help of RAID.

Accordingly, in cases where a read request is directed to data stored on a disk in an unavailable enclosure, the available data portions can be read from sections in disks which are not located in the unavailable enclosure, and the missing data can be reconstructed using the parity bits of the respective stripe (block 303).

To this end RAID control unit 107 can be configured to receive a read request from I/O management module 108, obtain information indicative of the relevant RAID group and whether this RAID group has members stored in an enclosure which is unavailable. If a number (which does not exceed the parity number) of the RAID group's members are stored in disks located in an enclosure which is currently unavailable, RAID control unit 107 is operable to reconstruct the missing data portions from the available data portions with the help of the parity bits.

As mentioned above, in general, during normal operation of storage system 102, when one or more disks fail, a rebuild process is initiated by the system in order to reconstruct the missing data portions which were stored on the failing disk. However, in case an entire enclosure is unavailable and as a result a large number of RAID groups require undergoing a rebuild process, this would cause the storage system to sustain a considerable load. Furthermore, assuming that unavailability of the enclosure is related to the enclosure alone and the disks are not damaged, once the enclosure becomes available again, the disks in the enclosure become available as well. Therefore, it would be advantageous to avoid migration of the data, in a costly rebuild process, to alternative locations. At the same time it is necessary to handle events where data is destined to be read from or written to a disk located in the unavailable enclosure. Thus, in accordance with the presently disclosed subject matter, the rebuild process is delayed or inhibited. Only specific data, which relate to a read or write request, are manipulated.

Optionally, in case of an enclosure unavailability (e.g. as a result of an enclosure failure), control layer 103 can be operable to switch to a read only mode in which all write requests (as well as management operations which necessitate writing) are rejected or delayed until the enclosure has recovered. Alternatively, the following sequence of operations can be executed.

A write request is received via I/O management module 108. The data, which is received by I/O management module 108, is arranged in stripes in the cache memory 105, ready to be destaged to the disks. The stripes are analyzed to determine whether any and which of the sections in a stripe are directed to disks located in an unavailable disclosure (block 302). In case data is directed to be written to a given RAID group ("original RAID group") having sections stored on one or more disks in an unavailable enclosure, at least one respective temporary RAID group is allocated in the system's spare storage space (block 305). The temporary RAID groups are allocated in disks located in enclosures other than the unavailable enclosure. New stripes, comprising the data in the write request, are written to the temporary RAID group (block 307). Once the data is written to the temporary RAID group the allocation tables (e.g. trie) are updated to indicate, inter alia, the location of the newly written data (block 309).

To this end RAID control unit 107 can be configured to receive a write request from I/O management module 108, obtain information indicative of the relevant RAID group and whether this RAID group is stored in an enclosure which is available or not. If the enclosure is unavailable, RAID control unit 107 is operable to allocate a temporary RAID group in the spare storage space and write the received data in the allocated RAID group.

A write request can be received for example from a host connected to system 102 or as part of a management operation (such as unmap in some systems) which may include write operations to one or more disks located in an unavailable enclosure.

In general a storage space in the storage system which is currently allocated as spare storage space, is maintained for system operations (such as defragmentation and rebuild) and is thus configured to be unavailable for writing data received in read requests. According to the presently disclosed subject matter, in case data received in a write request, is directed to an unavailable enclosure, RAID control unit 107 is configured using the spare storage space for storing the data received in the write request.

Read and write requests are handled according to the aforementioned principles as long as the enclosure is unavailable. Once the enclosure is recovered, the data in the temporary RAID groups is copied to the respective original RAID group(s), including to members of the RAID group which are allocated to disks located in the recovered enclosure (block 313). This operation can be executed as part of a background process.

In response to information received by RAID control unit 107 indicating that the enclosure is available, RAID control unit 107 can be operable to copy the data from the temporary RAID group allocated in the spare storage space to the recovered enclosure. Once the data is copied to the recovered enclosure the allocation tables (e.g. trie) are updated to indicate the current location of the data which has been copied and to indicate the updated size of the disk space, which now does not include the temporary RAID groups which have been freed (block 315).

FIG. 4 is another flowchart illustrating a sequence of operations carried out, in accordance with the presently disclosed subject matter. FIG. 4 demonstrates another approach for handling a write request directed to an unavailable enclosure. At block 401 a write request is received via I/O management module 108. The data, which is received by I/O management module 108, is arranged in stripes in the cache memory 105, ready to be destaged to the disks.

The stripes are analyzed to determine whether any and which of the sections in a stripe are directed to disks located in an unavailable disclosure (block 403). Assuming, that a RAID group comprises N data portion (and M parity portions) it is determined which of the N data portions (or sections) are directed to disks located in an unavailable enclosure.

Assuming that i sections are directed to disks located in an unavailable enclosure, the sections which are destined to disks located in available enclosures (N−i) are written to their original destination (block 405) and the i sections which are destined to disks located in an unavailable enclosure are written to a storage area allocated in the spare storage space (block 407).

The allocation tables (e.g. trie) are updated to indicate, inter alia, the location of the newly written data (block 409), including both the location of the sections written to their original destination and the location of the sections written to the spare storage space. For example, to this end, another special allocation table can be used indicating the location of the sections which are written to the spare storage space. The regular allocation table, used for indicating the location of data in the storage system, can include a special mark (e.g. a byte), associated with the sections which are temporarily written to the spare storage space, indicating that these sections are stored in the spare storage space. Thus, in case of a read command requesting for sections, the associated mark directs the system (e.g. I/O management module) to search for information with respect to the location of these sections in the special allocation tables to enable retrieval of the requested data. The sections written to their original destination are retrieved therefrom (to the cache memory 105) with the help of the regular allocation table.

Once the unavailable enclosure is recovered, the sections written to the spare storage space are moved back to their original location in the disks in the recovered enclosure (block 411) and the allocation tables are updated accordingly (block 413). This process can be executed as a background process.

When an enclosure becomes unavailable in a planned manner (e.g. as part of a maintenance process), several preparatory actions can be carried out before the disconnection of the enclosure in order to improve the performance of the system. FIG. 5 is a flowchart illustrating a sequence of operations carried out in preparation for enclosure-unavailability, in accordance with the presently disclosed subject matter.

At block 501, before disconnecting a closing enclosure, RAID groups stored on disks in the enclosure which are about to become unavailable (referred to herein as "closing enclosure"), are analyzed in order to identify any RAID groups that have more than a predefined number of sections (M) stored on disks located in the closing enclosure. The predefined number of sections M corresponds to the number of parity bits in a stripe used by the current RAID scheme. In case the number of sections of the same RAID group, which are stored in a closing enclosure, is greater than the parity number, it will not be possible to reconstruct the data in this RAID group. Thus, the predefined number (M) can be defined as equal to the number of parity bits or less. For example in case two parity bits are used (as in RAID 6) M can be set to equal 2. In some cases, in order to avoid loss of data, in case of an additional error, the predefined number of sections can be set to M−1 or M−2 instead of M.

If such a RAID group is identified, an alternative RAID group, which does not violate this condition (i.e. does not have more than the predefined number of sections stored on disks located in the closing enclosure), are allocated (block 503). The data is copied from the old RAID group in the closing enclosure, to the newly allocated RAID group (block 505). The enclosure can then be made unavailable (block 507). The process can then continue as described above with reference to FIG. 3 or FIG. 4 (block 509) for handling read and/or write requests.

RAID control unit 107 can be configured to determine whether a closing enclosure comprises more than a predefined number of sections of the same RAID group. If such an RAID group is identified, RAID control unit 107 can be configured to allocate an alternative RAID group, in other enclosures, and copy the data from the old RAID group to the alternative RAID groups as described above.

Figure 6:
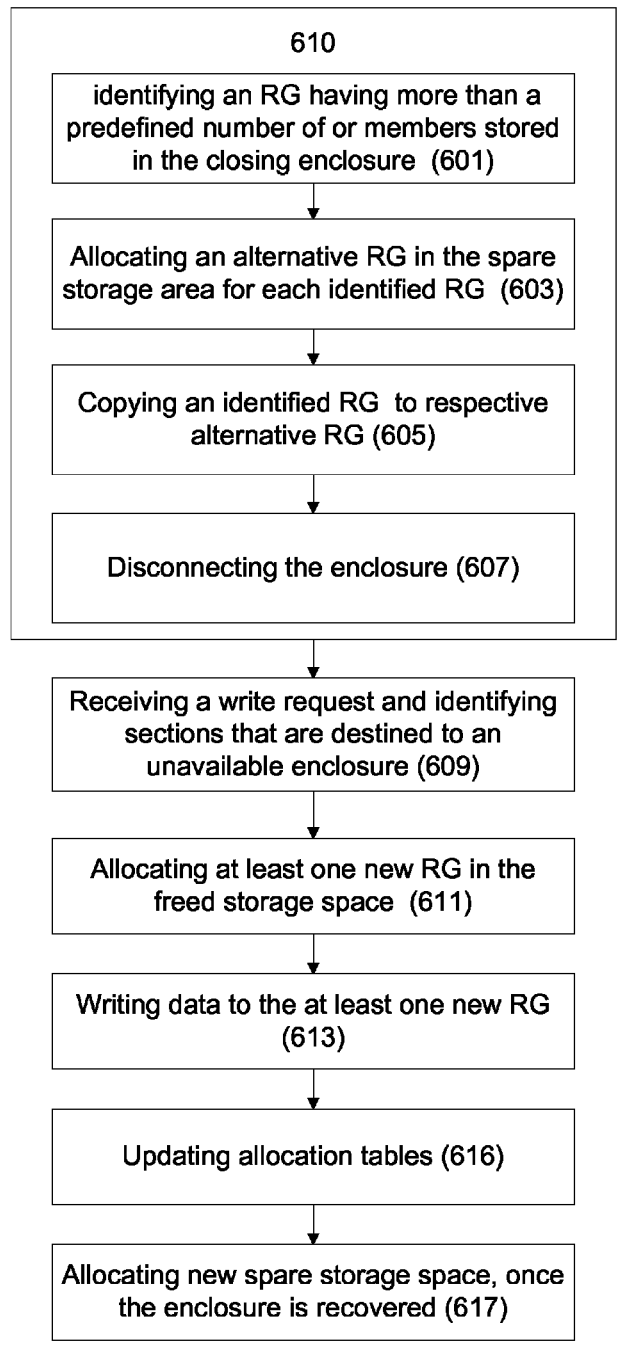
FIG. 6 is another flowchart illustrating a sequence of operations carried out in preparation to enclosure-unavailability, in accordance with the presently disclosed subject matter.

An alternative sequence of preparatory operations which can be carried out before an enclosure is made unavailable in order to improve the performance of the system, is described with reference to FIG. 6.

At block 610, before the enclosure becomes unavailable, a plurality of disks located in the enclosure which is about to become unavailable, are phased out. The number of disks, which are phased out, is roughly equivalent in disk space to the disk space available in the spare storage space. For example, in a system with 512 disks and 5% spare storage space the number of disks in the spare storage space is around 24. Since, as a result of this the spare storage space is occupied, rebuild processes are not executed during the time the enclosure is unavailable.

During the phase out process, the RAID groups stored in the closing enclosure are analyzed in order to identify RAID groups having more than a predefined number of members stored in the closing enclosure (block 601). In case such RAID groups are identified, respective alternative RAID groups are allocated in the spare storage space of the system (block 603). The entire data in the identified RAID groups are copied from their original locations, to the respective alternative RAID groups, allocated in the spare store space (block 605).

As explained above, members of a given RAID group are distributed in a plurality of different enclosures. As the entire RAID groups (including also members which are stored in enclosures, other than the closing enclosure) are copied from their original location to respective alternative RAID groups in the spare storage space, free storage space is now available in disks located on enclosures, other than the closing enclosure, which were previously occupied by members of the removed RAID groups. This free storage space is utilized for writing incoming data during the time the closing enclosure is unavailable.

Optionally, RAID groups are copied to the spare storage space according to a predefined priority scheme. Initially, all RAID groups having more than a predefined number of members (M) stored in the closing enclosure, are copied to the respective alternative RAID groups allocated in the spare storage space. Then, in case additional free storage space remains in the spare storage space, other RAID groups having a lesser number of sections (e.g. M−1 and/or M−2) stored in the closing enclosures are also copied to the respective alternative RAID groups.

Once the relevant RAID groups are copied from the closing enclosure, the enclosure can be disconnected (block 607). At block 609 a write request is received by control layer 103. If any part of the data in the write request is identified to be directed to a disk in the unavailable enclosure, at least one new RAID group is allocated in the freed storage space in the system (block 611) and the data in the write request is written thereto (block 613). Once the data is written to the RAID groups, the allocation tables (e.g. trie) are updated to indicate, inter alia, the location of the data (block 615).

It is assumed that the freed storage space provides enough storage space to handle write requests during the time the closing enclosure is unavailable. Furthermore, since the data which is received in a write request while the closing enclosure is unavailable, is written to regular disks in the storage space and not to the spare space, there is no need to move the RAID groups once the closing enclosure is recovered, neither is it required to update the allocation tables.

Once the enclosure is recovered a new spare storage space can be allocated in the recovered enclosure (block 617). Optionally, the allocated spare space can be distributed over time (in a background process) across the entire storage system. Once the new spare storage space is allocated, the rebuild process is enabled once more.

It will also be understood that the system according to the presently disclosed subject matter may be a suitably programmed computer. Likewise, the presently disclosed subject matter contemplates a computer program being readable by a computer for executing the method of the presently disclosed subject matter. The presently disclosed subject matter further contemplates a machine-readable memory tangibly embodying a program of instructions executable by the machine for executing the method of the presently disclosed subject matter. The machine-readable memory includes, but is not limited to, non-transitory machine-readable computer memory such as for example, CD-ROM, a memory device, a hard drive.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

The invention claimed is:

1. For use with a storage system comprising a plurality of disk enclosures constituting a physical storage space, each disk enclosure comprising a plurality of physical disks, said physical storage space is configured as a plurality of RAID groups, each RAID group comprising a space for storing members, wherein the members comprise data members and parity members; a method of managing allocation of data in case a given disk enclosure of the plurality of disk enclosures is disconnected, the method comprising:
    before a preplanned disconnection of the given disk enclosure:
        identifying a given RAID group having more than a predefined number of members stored in the given enclosure, wherein said predefined number corresponds to a number of said parity members in said given RAID group;
        allocating an alternative RAID group for data of the given RAID group; wherein said alternative RAID group does not have more than said predefined number of members;
        copying data from said given RAID group to said alternative RAID group; and
        disconnecting said given disk enclosure upon successful copying of the data;
    responsive to a write request following the disconnecting:
        identifying in a stripe to be written at least one section allocated to a disk in the given disk enclosure;
        allocating a temporary RAID group in a spare storage space of the storage system; and
        writing data related to the write request in the temporary RAID group.

2. The method according to claim 1 further comprising inhibiting a rebuild process on disks in said given disk enclosure.

3. The method according to claim 1 the method further comprising:
    in case the given disk enclosure becomes available, copying data from the alternative RAID group to the given RAID group.

4. The method according to claim 1 wherein said predefined number is equal to the number of said parity members in said given RAID group.

5. The method according to claim 1 wherein said storage system implements RAID 6 and the number of said parity members in said given RAID group equals 2.

6. For use with a storage system comprising a plurality of disk enclosures constituting a physical storage space, each disk enclosure comprising a plurality of physical disks, said physical storage space is configured as a plurality of RAID groups, each RAID group comprising space for storing members, wherein the members comprise data members and parity members; a method of managing allocation of data in case a given disk enclosure of the plurality of disk enclosures is disconnected, the method comprising:
    before a preplanned disconnection of the given disk enclosure:
        identifying a given RAID group having more than a predefined number of members stored in the given disk enclosure, wherein said predefined number corresponds to a number of said parity members in said given RAID group;
        allocating an alternative RAID group for data of the given RAID group; wherein said alternative RAID group does not have more than said predefined number of members;
        copying data from said given RAID group to said alternative RAID group; and
        disconnecting said given disk enclosure upon successful copying;
    responsive to a write request following the disconnecting:
        identifying in data to be written to the given RAID group at least one section of a first type, destined to be written to a disk located in the given disk enclosure and sections of a second type destined to be written to other respective disks in other disk enclosures;
        writing data in said at least one section of said first type to a spare storage space of the storage system;
        writing data in said sections of said second type to said other respective disks.

7. The method according to claim 6 further comprising, updating an allocation table to indicate that said at least one section of said first type is stored in said spare space of the storage system.

8. The method according to claim 6 wherein, in case the given disk enclosure becomes available, the method further comprising:
    copying said at least one section of said first type from the spare storage space to said given disk enclosure and updating one or more respective allocation tables.

9. For use with a storage system comprising a plurality of disk enclosures constituting a physical storage space, each disk enclosure comprising a plurality of physical disks, said physical storage space is configured as a plurality of RAID groups, each RAID group comprising space for storing members, the members comprise data members and parity members; a method of managing allocation of data in case a given disk enclosure of the plurality of disk enclosures is disconnected, the method comprising:
    before a preplanned disconnection of the given enclosure:
        identifying a given RAID group having more than a predefined number of members stored in the given disk enclosure, wherein said predefined number corresponds to a number of said parity members in said given RAID group;
        allocating an alternative RAID group for data of the given RAID group, in a spare storage space of said storage system; wherein said alternative RAID group does not have more than said predefined number of members;
        copying data from said given RAID group to the alternative RAID group, thereby obtaining free storage space which has been allocated to said given RAID group in disks located in enclosures other than said given disk enclosure; and
        disconnecting said given disk enclosure upon successful copying.

10. The method according to claim 9 further comprising:
responsive to a write request:
identifying in a stripe to be written, at least one section directed to a disk in the given disk enclosure;
allocating at least one new RAID group in said free space; and
writing data related to the write request to the new RAID group.

11. The method according to claim 9 wherein, in case said given disk enclosure becomes available, the method further comprising:

allocating a new spare storage space in said given enclosure.

12. A control layer operatively connectible to a storage system, the storage system comprising a plurality of disk enclosures constituting a physical storage space, each disk enclosure comprising a plurality of physical disks, said physical storage space is configured as a plurality of RAID groups, each RAID group comprising space for storing members, wherein the members comprise data members and parity members; said control layer is associated with at least one processor and configured to manage allocation of data in case a given disk enclosure of the plurality of disk enclosures is disconnected;

before a preplanned disconnection of the given enclosure:
   identify a given RAID group having more than a predefined number of members stored in the given disk enclosure, wherein said predefined number corresponds to a number of said parity members in said given RAID group;
   allocate an alternative RAID group for data of the given RAID group; wherein said alternative RAID group does not have more than said predefined number of members;
   copy data from said identified RAID group to said alternative RAID group; and
   disconnect said given disk enclosure upon successful copying;
   responsive to a write request following the disconnection of said given disk enclosure, said control layer is operable to perform:
   identify in a stripe to be written to at least one section directed to a disk in the given enclosure; allocate a temporary RAID group in a spare storage space of the storage system; and write data related to the write request in the temporary RAID group.

13. The control layer according to claim 12 being further operable to inhibit a rebuild process on disks in said given disk enclosure while the given disk enclosure is disconnected.

14. The control layer according to claim 12 being further operable, in case the given disk enclosure becomes available to copy data from the temporary RAID group to the given RAID group.

15. The control layer according to claim 12, wherein said predefined number being equal to the number of said parity members in said given RAID group.

16. A control layer operatively connectible to a storage system, the storage system comprising a plurality of disk enclosures constituting a physical storage space, each disk enclosure comprising a plurality of physical disks, said physical storage space is configured as a plurality of RAID groups, each RAID group comprising space for storing members, the members comprise data members and parity members; said control layer is associated with at least one processor and configured to manage allocation of data in case a given disk enclosure of the plurality of disk enclosures is disconnected;
   the control layer being operable before a preplanned disconnection of said given disk enclosure:
   to identify a given RAID group having more than a predefined number of members stored in the given disk enclosure, wherein said predefined number corresponds to a number of said parity members in said given RAID group DB allocate an alternative RAID group for data of the given RAID group, in a spare storage space of said storage system; wherein said alternative RAID group does not have more than said predefined number of members in said given enclosure; copy data from said given RAID group to the alternative RAID group, thereby obtaining free storage space which has been allocated to said given RAID group in disks located in enclosures other than said given disk enclosure; and disconnect said given disk enclosure upon successful copying.

17. The control layer according to claim 16 being further configured, responsive to a write request to: identify in a stripe to be written, at least one section directed to a disk in the given disk enclosure; allocate at least one new RAID group in said free space; and write data related to the write request to the new RAID group.

18. The control layer according to claim 16 being further configured, in case said given disk enclosure becomes available, to allocate a new spare storage space in said given enclosure.

19. A non-transitory machine-readable storage medium, tangibly embodying a program of instructions executable by the machine to perform a method of managing allocation of data in case a given disk enclosure of a plurality of disk enclosures in a storage system is disconnected, wherein the plurality of disk enclosures constituting a physical storage space, each disk enclosure comprising a plurality of physical disks, said physical storage space is configured as a plurality of RAID groups, each RAID group comprising N parity members;
   the method comprising performing before a preplanned disconnection of the given disk enclosure:
   identifying a given RAID group having more than a predefined number of members stored in the given disk enclosure, wherein said predefined number corresponds to a number of said parity members in said given RAID group;
   allocating an alternative RAID group for data of the given RAID group; wherein said alternative RAID group does not have more than said predefined number of members;
   copying data from said given RAID group to said alternative RAID group; and
   disconnecting said given disk enclosure upon successful copying;
   the method comprising performing, responsive to a write request following the disconnecting:
   identifying in a stripe to be written at least one section directed to a disk in an unavailable disk enclosure; allocating at least one temporary RAID group in a spare storage space of the storage system; and writing data related to the write request in the alternative RAID group;
   identifying in a stripe to be written to a given RAID group at least one section of a first type, destined to be written to a disk located in an unavailable disk enclosure and sections of a second type destined to be written to other respective disks in other enclosures; writing data in said at least one section of said first type to a spare storage space of the storage system; and writing data in said sections of said second type to said other RAID groups.

* * * * *